Oct. 6, 1925.

A. L. KISS 1,555,988

INCUBATOR

Filed Jan. 15, 1924   2 Sheets-Sheet 1

Inventor:
Aladar Ledacs Kiss
By Marks & Clerk
attys.

Oct. 6, 1925.
A. L. KISS
1,555,988
INCUBATOR
Filed Jan. 15, 1924      2 Sheets-Sheet 2
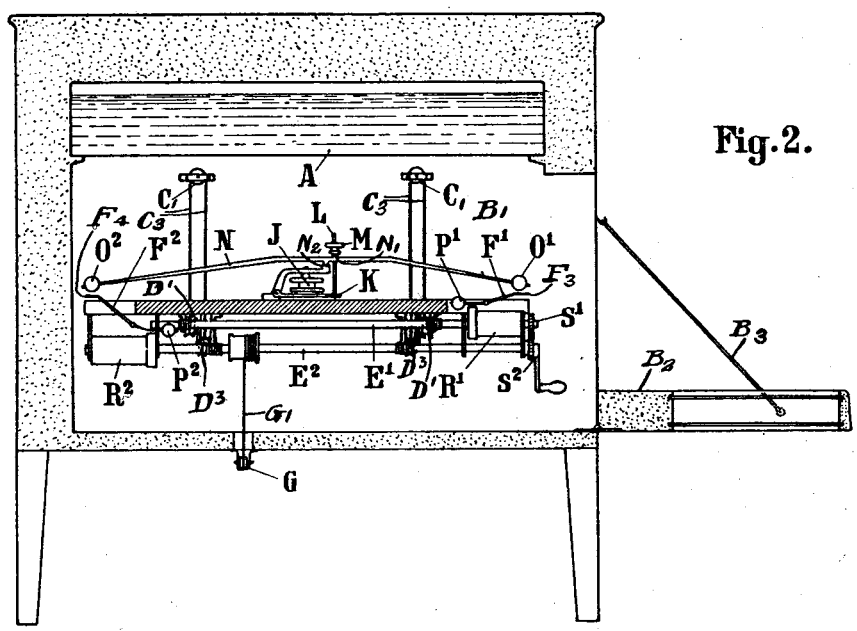
Fig. 2.
Fig. 4.
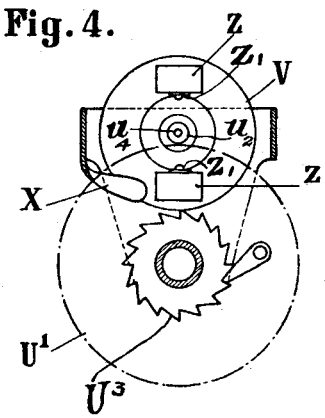
Inventor:
Aladar Ledacs Kiss
By Marks & Clerk
Attys.

Patented Oct. 6, 1925.

1,555,988

UNITED STATES PATENT OFFICE.

ALADÁR LEDÁCS KISS, OF BUDAPEST, HUNGARY, ASSIGNOR OF ONE-HALF TO GEORGE MOLNAR, OF BUDAPEST, HUNGARY.

INCUBATOR.

Application filed January 15, 1924. Serial No. 686,447.

To all whom it may concern:

Be it known that I, ALADÁR LEDÁCS KISS, a citizen of the Hungarian Republic, residing at 16 Erzsebet ter, Budapest, V., Hungary, have invented certain new and useful Incubators, of which the following is a specification.

The subject of this invention is an incubator, in which the heat required for hatching the eggs is provided by hot water being supplied once a day. The new incubator has the advantage that it automatically regulates the heat in an accurate manner, without it being necessary for the hot water to be poured in at a definite time or in a definite quantity or at a definite temperature.

Figure 1:
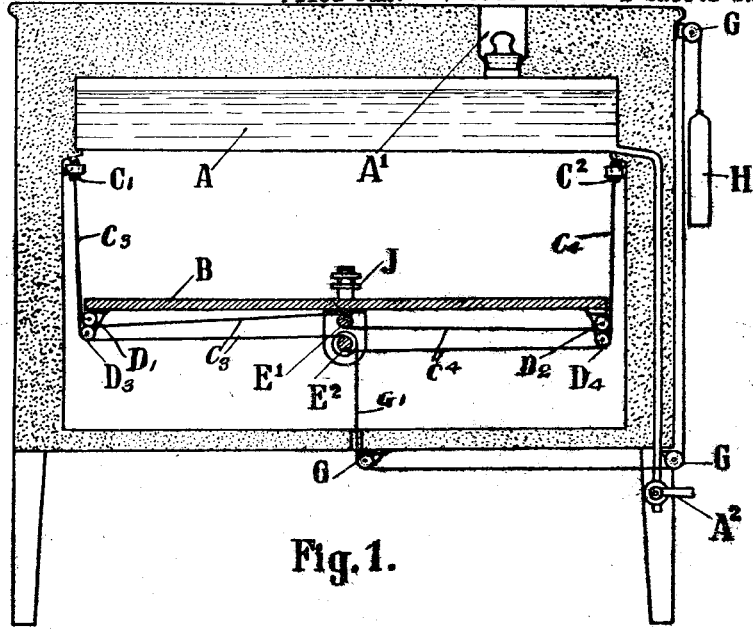
Figure 3:
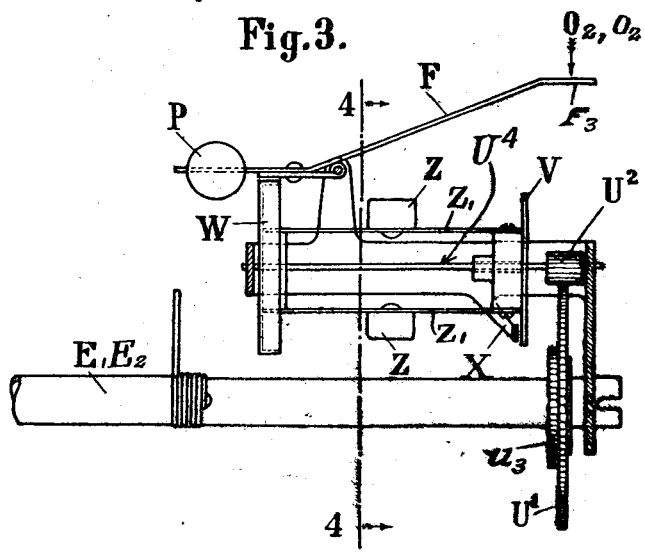

In the accompanying drawing a constructional example of the invention is shown, Figure 1 being a longitudinal section of the incubator, Figure 2 a corresponding cross-section, Figure 3 a longitudinal section through the heat regulating device, Figure 4 a section on line 4—4 of Figure 3.

In the incubator according to the invention the heating medium is hot water which is held in a container A. As the heating medium in this container does not have a constant temperature, the heat given off by it is not uniform. After water has been added, the container is very hot and it cools off gradually. According to the present invention the distance of the egg tray B from the water container A is variable, so as to obtain a constant heat for the eggs. The movement of the egg tray B for varying its height is effected by automatic means comprising a thermostat J, which travels together with the egg tray and is located at or near the level of eggs placed on the tray B, and a combined operating and braking device controlled by the thermostat, the arrangement being such that when the temperature in the egg chamber $B_1$ at the level at which the eggs are situated varies from the normal incubating temperature. the thermostat causes the operating gear to move the egg tray either up or down, until the eggs together with the thermostat J reach a level within the egg chamber having just the proper incubating temperature, whereupon the thermostat automatically resumes its initial state in which it causes the braking device to keep the egg tray at the level having just the proper temperature for incubating.

The egg tray B (Fig. 1) is suspended at four points to the rollers $C_1$, $C_2$ rotatably mounted on the walls of the egg chamber $B_1$ by means of cords $C_3$, $C_4$ passing over pulleys $D_1$, $D_2$ and $D_3$, $D_4$, respectively, arranged on the egg tray B. The egg tray is also moved by means of these cords. To this end the cords $C_3$, $C_4$ are passed in such a manner round the shafts $E_1$ and $E_2$ mounted under the middle of the egg tray, that passing both ways from the shaft $E_1$, for instance, they run to the right and left over the pulleys $D_1$ and $D_2$ to the pulleys $C_1$ and $C_2$ and from the latter over other pulleys $D_3$ and $D_4$ back to the middle of the egg tray B and to a second shaft $E_2$, round which they are also wound. Around the shaft $E_2$ is wound in the opposite direction to the supporting cords $C_3$, $C_4$ another cord $G_1$, which is kept in tension by the weight H serving to move the egg tray B together with the thermostat J in both directions downwards as well as upwards. When the cord $G_1$ supporting the weight H and entering the egg chamber $B_1$ over the pulley G causes the shaft $E_2$ to rotate and thereby unwinds the cord $G_1$ from the said shaft, the supporting cords $C_3$, $C_4$ for the egg tray B will at the same time be wound on to the shaft $E_2$. If at the same time the brake is applied to the shaft $E_1$, the weight H will cause the portions $E_2$—$D_3$—$C_1$—$D_1$—$E_1$ and $E_2$—$D_4$—$C_2$—$D_2$—$E_1$ of the suspending cords to be shortened and thereby raise the egg tray B. When however the brake is applied to the shaft $E_2$ and the ends of the cords $C_3$ and $C_4$ wound on the shaft $E_1$ are allowed to run off, the portions named above of the system of cords $C_3$ and $C_4$ will become longer under the combined action of the weight H and the weight of the egg tray B itself, as well as the weight of the parts arranged on or placed upon the egg tray which will consequently descend.

The motion of the shafts $E_1$ and $E_2$ must be slowed down to such an extent that it may be properly braked by small forces. For this purpose the arrangement shown in Figures 3 and 4 for example may be used, which is provided with a centrifugal brake or automatically reducing the speed of revolution. On the shaft $E_1$ or $E_2$ is mounted a toothed wheel $U_1$, which is combined with a ratchet wheel $U_3$ and drives through gearing a toothed wheel $U_2$ and by this means operates the centrifugal brake W, Z, V on the shaft of the toothed wheel $U_2$. The discs W and V are connected together by flat springs $Z_1$, weights Z being fixed to the latter. On turning of the shaft $U_4$ the weights Z seek to swing outwards, which causes them to draw the disc V towards the disc W. This causes the disc V to come in contact with the stop X, which brakes it by friction. In this way the motion of the shaft $E_1$ or $E_2$ is retarded to the required extent, a brake $R_1$ or $R_2$ being provided on each of the shafts $E_1$ and $E_2$ (Fig. 2). The arrangement may be brought to rest completely by a weight P on a lever F. The lever F is controlled by the thermostat J. The movements due to the expansion of the thermostat are transmitted at the bottom to a lever K (Fig. 2) and by the latter through a rod L to the point $N_1$ of a two-armed lever N resting in a wedge-shaped recess provided in an adjusting screw M by means of which the egg tray can be so regulated as to be brought to rest in a certain temperature zone. On the other side, the thermostat J acts also upon a second point $N_2$ of the two-armed lever N directly as shown in Fig. 2. Weights $O_1$ and $O_2$ are provided at the ends of the arms of the lever N, the weight $O_2$ being greater than the weight $O_1$. At that end, at which one of these weights comes in contact with the small horizontal plate $F_3$ below the ends of the levers F, the weight P is raised from the disc, thereby releasing the brake $R_1$ or $R_2$ respectively.

The operation of the new incubator is as follows:

Assume first that at that level of the egg chamber $B_1$ at which the eggs and the thermostat J are held there exists a temperature proper for incubating. In this case, the two-armed lever N is held by the thermostat J in the position shown in Fig. 2 in which neither of the weights $O_1$ and $O_2$ contacts with its respective plate $F_3$; accordingly, both of the brakes $R_1$ and $R_2$ are in their on positions so that the weight H, the weight of the egg tray B and the weight of the entire load on the latter tending to rotate the shafts $E_1$ and $E_2$ cannot effect any movement of the said shafts. Supposing now that by any cause whatever, the temperature within the egg chamber $B_1$, at the level of the eggs (which are at the same level as that of the thermostat itself) rises, the thermostat will accordingly expand, thereby raising the point $N_2$ of the two-armed lever N. At the same time, the point $N_1$ of the lever N will be pulled down by the thermostat J through the intermediary of the rod K so that the weight $O_1$ comes into contact with its plate $F_3$ thereby raising, through the lever $F_1$, the weight $P_1$ and, consequently releasing the brake $R_1$ which holds the shaft $E_1$ stationary. The combined action of the weight H, the weight of the egg tray B and the weight of the eggs and all the parts attached to the egg tray B causes the shaft $E_1$ to rotate thereby unwinding the suspending cords $C_3$, $C_4$ from the shaft $E_1$. The shaft $E_2$ being at the same time held by its brake $R_2$, the portions $E_2$—$D_3$—$C_1$—$D_1$—$E_1$ and $E_2$—$D_4$—$C_2$—$D_2$—$E_1$ of the suspending cords will become longer and the egg tray B will consequently descend. As soon as the thermostat J, which moves together with the egg tray B into a level within the egg chamber $B_1$ more remote from the heating means A, reaches the level within the egg chamber having, under the present conditions, a temperature just proper for incubating, the thermostat will naturally return to its initial state shown in Fig. 2 in which neither of the weights $O_1$ and $O_2$ contacts with its plate $F_3$ and both brakes $R_1$ and $R_2$ are in their on positions. Should the temperature in the egg chamber at the level of the eggs fall the thermostat J will contract thereby causing the point $N_2$ of the two-armed lever N to be lowered by the weight $O_2$ which is larger than the weight $O_1$. Accordingly, the weight $O_2$ will contact with its plate $F_3$ thereby releasing the brake $R_2$. Consequently, the weight H will cause the shaft $E_2$ to rotate, the shaft $E_1$ however, being held by its brake $R_1$, the shaft $E_2$ will by its rotation wind the suspending cords $C_3$, $C_4$ on to the said shaft $E_1$ thereby shortening the portion. $E_2$—$D_3$—$C_1$—$D_1$—$E_1$, on one side and the portion $E_2$—$D_4$—$C_2$—$D_2$—$E_1$ on the other side. Accordingly, the egg tray and therewith the thermostat J will rise to a level within the egg chamber situated nearer to the heating means A and accordingly having a higher temperature. As soon as the thermostat J reaches the level within the egg chamber having just the proper temperature for incubating it will automatically resume its initial state shown in Fig. 2 in which both brakes $R_1$ and $R_2$ are held in their on positions.

After a certain time the weight H will sink down to the ground. In order to be able to wind up the arrangement from time to time like a clock the ratchet wheel $U_3$ is fixed to the toothed wheel $U_1$. A hinged door $B_2$, shown in Fig. 2 in the open position in which it is supported by cords $B_3$, allows access to the chamber $B_1$ for enabling the eggs to be placed upon the egg tray B, said door being swung upwards to close the chamber $B_1$ when the eggs have been placed in position.

In place of the centrifugal brake shown in Figures 3 and 4 braking means may be used, which make use of air or liquid resistance or of the action of a pendulum.

What I claim is:—

1. An incubator having in combination an egg chamber, a hot water container located above the egg chamber, an egg tray in the egg chamber, a thermostat capable of being acted on by the temperature prevailing in the egg chamber and means capable of being acted on by the thermostat for automatically controlling the distance of the egg tray from the water container, as set forth.

2. An incubator having in combination an egg chamber, a hot water container located above the egg chamber, an egg tray in the egg chamber, a thermostat capable of being acted on by the temperature prevailing in the egg chamber, means controllable by the thermostat for automatically raising the egg tray towards the hot water container, on the temperature in the egg chamber falling, means controllable by the thermostat for automatically lowering the egg tray away from the hot water container, on the temperature in the egg chamber rising and means for keeping the egg tray stationary, while the temperature remains constant, as set forth.

3. An incubator having in combination an egg chamber, a hot water container located above the egg chamber, an egg tray in the egg chamber, a thermostat mounted on the said egg tray capable of being acted on by the temperature prevailing in the egg chamber, means controllable by the thermostat for automatically raising the egg tray towards the hot water container, on the temperature in the egg chamber falling, means controllable by the thermostat for automatically lowering the egg tray away from the hot water container, on the temperature in the egg chamber rising, and means for keeping the egg tray stationary while the temperature remains constant, as set forth.

4. An incubator having in combination an egg chamber, a hot water container located above the egg chamber, an egg tray in the egg chamber, a thermostat capable of being acted on by the temperature prevailing in the egg chamber, means controllable by the thermostat for automatically raising the egg tray towards the hot water container, on the temperature in the egg chamber falling, means controllable by the thermostat for automatically lowering the egg tray away from the hot water container, on the temperature rising, and braking means capable of being acted on by the thermostat for keeping the egg tray stationary, while the temperature remains constant, as set forth.

5. An incubator having in combination an egg chamber, a hot water container located above the egg chamber, an egg tray in the egg chamber, means for automatically raising the egg tray towards the hot water container, a brake for maintaining said raising means inoperative, means for automatically lowering the egg tray away from the hot water container, a brake for maintaining said lowering means inoperative and a thermostat for releasing the brake for said raising means on the temperature in the egg chamber falling and releasing the brake for said lowering means on the temperature in the egg chamber rising, as set forth.

6. An incubator having in combination an egg chamber, a hot water container located above the egg chamber, an egg tray in the egg chamber, a thermostat capable of being acted on by the temperature prevailing in the egg chamber, means controllable by the thermostat for automatically raising the egg tray, a weight for actuating said raising means, means for lowering the egg tray, said means being intended to be actuated by the effective weight of the tray, and means for keeping the egg tray stationary, when the temperature remains constant, as set forth.

7. An incubator having in combination an egg chamber, a hot water container located above the egg chamber, an egg tray in the egg chamber, cords for suspending the egg tray, a thermostat capable of being acted on by the temperature prevailing in the egg chamber, winding means for the said cords, controllable by the thermostat for automatically raising the egg tray towards the hot water container, on the temperature in the egg chamber falling, and for automatically lowering the egg tray away from the hot water container, on the temperature rising, and means for keeping the egg tray stationary, while the temperature remains constant, as set forth.

8. An incubator having in combination an egg chamber, a hot water container located above the egg chamber, an egg tray in the egg chamber, cords for suspending the egg tray, a thermostat capable of being acted on by the temperature prevailing in the egg chamber, winding drums for the said cords mounted on the egg tray and controllable by the thermostat for automatically raising the egg tray towards the hot water container, on the temperature in the egg chamber falling, and for automatically lowering the egg tray away from the hot water container, on the temperature rising, and means for keeping the egg tray stationary, while the temperature remains constant, as set forth.

9. An incubator having in combination an egg chamber, a hot water container located above the egg chamber, an egg tray in the egg chamber, a thermostat capable of being acted on by the temperature prevailing in the egg chamber, means controllable by the thermostat for automatically raising the egg tray towards the hot water container, on the temperature in the egg chamber falling, means for automatically lowering the egg tray away from the hot water container, on the temperature rising, and centrifugal brakes for limiting the speed of the egg tray during its upward and downward motion, as set forth.

10. An incubator having in combination an egg chamber, a hot water container located above the egg chamber, an egg tray in the egg chamber, means comprising a raising shaft rotatably mounted on the egg tray for automatically raising the egg tray towards the hot water container, a weight for rotating said shaft, a brake for maintaining the raising shaft inoperative, means comprising a lowering shaft rotatably mounted on the egg tray for automatically lowering the egg tray away from the hot water container, said lowering shaft being intended to be rotated by the effective weight of the egg tray, a brake for maintaining said lowering shaft inoperative, pulleys mounted in the egg chamber, cords for suspending the egg tray, each of said cords straddling one of said pulleys and having its one end coiled round the raising shaft so as to be wound up thereon during the rotation of the raising shaft, and having its other end coiled round the lowering shaft so as to be wound up thereon during the rotation of the lowering shaft and a thermostat for releasing the brake on the raising shaft on the temperature in the egg chamber falling and releasing the brake on the lowering shaft on the temperature in the egg chamber rising, as set forth.

In testimony whereof I have signed my name to this specification.

ALADÁR LEDÁCS KISS.